(12) United States Patent
Zu et al.

(10) Patent No.: US 10,885,908 B2
(45) Date of Patent: Jan. 5, 2021

(54) METHOD AND APPARATUS FOR PROCESSING INFORMATION

(71) Applicant: Baidu Online Network Technology (Beijing) Co., Ltd, Beijing (CN)

(72) Inventors: Hualong Zu, Beijing (CN); Haiguang Yuan, Beijing (CN); Ran Xu, Beijing (CN); Fang Duan, Beijing (CN); Chen Chen, Beijing (CN); Lei Shi, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/855,422

(22) Filed: Dec. 27, 2017

(65) Prior Publication Data

US 2019/0147859 A1 May 16, 2019

(30) Foreign Application Priority Data

Nov. 16, 2017 (CN) .......................... 2017 1 1140599

(51) Int. Cl.
*G10L 15/22* (2006.01)
*G06T 11/60* (2006.01)
*G10L 15/08* (2006.01)
*G06F 3/16* (2006.01)
*G10L 13/00* (2006.01)
*G01W 1/10* (2006.01)

(52) U.S. Cl.
CPC .............. *G10L 15/22* (2013.01); *G06F 3/167* (2013.01); *G06T 11/60* (2013.01); *G10L 13/00* (2013.01); *G10L 15/08* (2013.01); *G01W 1/10* (2013.01); *G01W 2203/00* (2013.01)

(58) Field of Classification Search
CPC .... G01W 1/10; G01W 2203/00; G10L 15/00; G10L 17/00; G10L 15/22; G10L 13/00; G10L 15/08; G06F 16/24; G06F 16/33; G06F 16/20; G06F 16/30; G06F 3/04; G06F 3/167; G06F 16/4393; G06T 11/60; Y02A 90/10
See application file for complete search history.

(56) References Cited

U.S. PATENT DOCUMENTS

2003/0028380 A1* 2/2003 Freeland ................. G10L 13/00
 704/260
2003/0187944 A1* 10/2003 Johnson ............ G06F 17/30899
 709/209

(Continued)

FOREIGN PATENT DOCUMENTS

| CN | 101893725 A | 11/2010 |
| CN | 101957713 A | 1/2011 |
| CN | 106782537 A | 5/2017 |

*Primary Examiner* — Sanchita Roy
(74) *Attorney, Agent, or Firm* — Nixon Peabody LLP

(57) ABSTRACT

An embodiment of the present application discloses a method and apparatus for processing information. A specific implementation of the method comprises: receiving a weather-related voice request sent by a user; identifying the voice request, and obtaining weather information corresponding to the voice request; extracting key information based on the weather information to generate a weather data set; and feeding weather data in the weather data set back to the user. The implementation can help to enrich broadcasting ways and/or broadcasting contents of the weather information.

11 Claims, 7 Drawing Sheets

(56) References Cited

U.S. PATENT DOCUMENTS

| | | | | |
|---|---|---|---|---|
| 2004/0043760 A1* | 3/2004 | Rosenfeld | ............... | H04L 67/16 |
| | | | | 455/414.3 |
| 2004/0055442 A1* | 3/2004 | Terada | ................. | G10H 1/0008 |
| | | | | 84/601 |
| 2004/0205614 A1* | 10/2004 | Keswa | ................... | H04L 63/08 |
| | | | | 715/239 |
| 2005/0015197 A1* | 1/2005 | Ohtsuji | ................. | G01C 21/34 |
| | | | | 701/533 |
| 2006/0020473 A1* | 1/2006 | Hiroe | ................... | G10L 13/027 |
| | | | | 704/275 |
| 2006/0095210 A1* | 5/2006 | Chan | ....................... | G01W 1/10 |
| | | | | 702/3 |
| 2009/0210353 A1* | 8/2009 | Mitchell | ................ | G01W 1/10 |
| | | | | 705/36 R |
| 2012/0141046 A1* | 6/2012 | Chen | ....................... | G01C 21/32 |
| | | | | 382/282 |
| 2013/0036080 A1* | 2/2013 | Kane-Esrig | ............ | A61B 5/165 |
| | | | | 706/46 |
| 2015/0198738 A1* | 7/2015 | Gupta | .................... | G01W 1/06 |
| | | | | 702/3 |
| 2016/0117372 A1* | 4/2016 | Krafft | .................... | G06F 16/26 |
| | | | | 715/739 |
| 2016/0309299 A1* | 10/2016 | Chu | ....................... | H04W 4/20 |
| 2018/0231685 A1* | 8/2018 | Rainey | .................. | G06Q 50/26 |

* cited by examiner

Beijing issued a rainstorm blue alert on August 3rd, and it is suggested that you strengthen the precautionary measures and pay close attention to weather changes August 3rd  Thursday
 Haidian District of Beijing 46 Excellent air quality
Fit to go out and have
a breathe of fresh air August 3rd   Thursday
Haidian District of Beijing

Fig. 3C

| PM2.5 | PM10 | SO$_2$ |
|---|---|---|
| Excellent 14 | Excellent 49 | Excellent 2 |
| NO$_2$ | O$_3$ | CO |
| Excellent 2 | Excellent 21 | Excellent 0.39 |

August 3rd   Thursday
Haidian District of Beijing

Fig. 3D

| Today | Tomorrow | The day after |
| August 3rd | August 4th | tomorrow |
| | | August 5th |
| Excellent | Excellent | Good |
Haidian District of Beijing
Fig. 3E
Clothing: Ultraviolet light: Cold: Less
Hot        Strong
Exercise:    Travel:      Travel:
Relatively   Suitable     Suitable
suitable
Haidian District of Beijing
Fig. 3F

METHOD AND APPARATUS FOR PROCESSING INFORMATION

CROSS-REFERENCE TO RELATED APPLICATION

This application is related to and claims the priority from Chinese Application No. 201711140599.9, filed on Nov. 16, 2017, entitled "Method and Apparatus for Processing Information," having Baidu Online Network Technology (Beijing) Co., Ltd. as the applicant, the entire disclosure of which is incorporated herein by reference.

TECHNICAL FIELD

Embodiment of the present application relate to the field of computer technology, specifically to the field of Internet technology, and more specifically to a method and apparatus for processing information.

BACKGROUND

Traditional weather forecast has two main approaches:

One is manual broadcasting. For this type of broadcasting, it is generally necessary to prepare a manuscript in advance, and then an announcer broadcasts according to the manuscript.

The second one is machine broadcasting. For this type of broadcasting, generally a machine obtains a formed weather forecast manuscript on the Internet, and then uses TTS (Text To Speech) technology to perform synthesis, so as to play a weather forecast.

SUMMARY

Embodiment of the present application provides a method and apparatus for processing information.

In a first aspect, the embodiment of the present application provides a method for processing information, including: receiving a weather-related voice request sent by a user; identifying the voice request, and obtaining weather information corresponding to the voice request; extracting key information based on the weather information to generate a weather data set; and feeding weather data in the weather data set back to the user.

In some embodiments, the feeding the weather data in the weather data set back to the user includes: performing a voice broadcast on the weather data in the weather data set.

In some embodiments, the extracting the key information based on the weather information to generate the weather data set includes: extracting the key information based on the weather information, and selecting a background image from a prestored background image set; generating a screen image based on the key information and the selected background image; and the feeding the weather data in the weather data set back to the user includes: presenting the screen image in the weather data set.

In some embodiments, the method further includes: selecting, in response to currently detecting weather early warning information, a background image matching a weather type indicated by the weather early warning information from the background image set; generating an early warning screen image based on the weather early warning information and the selected matched background image; and performing a voice broadcast on the weather early warning information, and presenting the early warning screen image.

In some embodiments, the generating the screen image based on the key information and the selected background image to generate the weather data set includes: determining a weather icon corresponding to the weather information, wherein the weather icon includes at least one of a static picture, a dynamic image and a video; and generating the screen image based on the determined weather icon, the key information and the selected background image to generate the weather data set, wherein the background image includes at least one of a static picture, a dynamic image and a video.

In some embodiments, the performing a voice broadcast on the weather data in the weather data set includes: performing voice synthesis on the weather data in the weather data set to generate a voice message containing background sounds, wherein the background sounds include background music or sound effects related to the weather information; and broadcasting the voice message according to preset requirements, wherein the preset requirements include at least one of a language, a speech speed, a speech tone and a sound type.

In some embodiments, the content of the voice request includes a weather information need for a single day or a weather information need for at least two days, and the weather information need for a single day includes at least one of the following requirements: a whole-day weather of a given day, a target-period weather of the given day, a reference index of the given day and air quality of the given day, wherein the reference index includes at least one of a dressing index, a car washing index, an exercise index, a traveling index, a cold index and an ultraviolet index.

In some embodiments, when the content of the voice request includes the air quality of the given day, after generating the screen image based on the key information and the selected background image, the method further includes: obtaining parameter information of a target contaminant based on information of the air quality of the given day; generating a contaminant screen image based on the parameter information and the selected background image, and generating a weather data set; and the presenting the screen image in the weather data set includes: presenting the screen image and the contaminant screen image in sequence according to a preset sequence.

In some embodiments, the content of the voice request further includes weather comparison in different time periods in an identical place, wherein the weather comparison includes temperature comparison; and the method further includes: computing a differential between maximum temperatures in different time periods, and judging whether the differential is in a preset range value; and determining a comparison result according to a judging result, and performing a voice broadcast on the comparison result.

In some embodiments, in response to detecting a first operation of a user, the method further includes: determining whether a current voice broadcast is being carried out, and stopping the current voice broadcast if affirmed; and determining whether the screen image is currently being presented, and continuing presenting the screen image if affirmed.

In a second aspect, the embodiment of the present application provides an apparatus for processing information, including: a receiving unit, configured for receiving a weather-related voice request sent by a user; an identifying unit, configured for identifying the voice request, and obtaining weather information corresponding to the voice request; a first generating unit, configured for extracting key information based on the weather information to generate a weather data set; and a feedback unit, configured for feeding weather data in the weather data set back to the user.

In some embodiments, the feedback unit is further configured for performing a voice broadcast on the weather data in the weather data set.

In some embodiments, the first generating unit further includes: a selecting subunit, configured for extracting the key information based on the weather information, and selecting a background image from a prestored background image set; a generating subunit, configured for generating a screen image based on the key information and the selected background image to generate a weather data set; and the feedback unit is further configured for presenting the screen image in the weather data set.

In some embodiments, the apparatus further includes: a detecting unit, configured for responding to currently-detected weather early warning information; a matching unit, configured for selecting a background image matching a weather type indicated by the weather early warning information from the background image set; a second generating unit, configured for generating an early warning screen image based on the weather early warning information and the selected matched background image; and a presenting unit, configured for performing a voice broadcast on the weather early warning information, and presenting the early warning screen image.

In some embodiments, the generating subunit is further configured for: determining a weather icon corresponding to the weather information, wherein the weather icon includes at least one of a static picture, a dynamic image and a video; and generating the screen image based on the determined weather icon, the key information and the selected background image to generate the weather data set, wherein the background image includes at least one of a static picture, a dynamic image and a video.

In some embodiments, the feedback unit is further configured for: performing voice synthesis on the weather data in the weather data set to generate a voice message containing background sounds, wherein the background sounds include background music or sound effects related to the weather information; and broadcasting the voice message according to preset requirements, wherein the preset requirements include at least one of a language, a speech speed, a speech tone and a sound type.

In some embodiments, the content of the voice request includes a weather information need for a single day or a weather information need for at least two days, and the weather information need for a single day includes at least one of the following requirements: a whole-day weather of a given day, a target-period weather of the given day, a reference index of the given day and air quality of the given day, wherein the reference index includes at least one of a dressing index, a car washing index, an exercise index, a traveling index, a cold index and an ultraviolet index.

In some embodiments, when the content of the voice request includes the air quality of the given day, the apparatus further includes: an obtaining unit, configured for obtaining parameter information of a target contaminant based on information of the air quality of the given day; a third generating unit, configured for generating a contaminant screen image based on the parameter information and the selected background image, and generating a weather data set; and the feedback unit is further configured for presenting the screen image and the contaminant screen image in sequence according to a preset sequence.

In some embodiments, the content of the voice request further includes weather comparison in different time periods in an identical place, wherein the weather comparison includes temperature comparison; and the apparatus further includes: a computing unit, configured for computing a differential between maximum temperatures in different time periods, and judging whether the differential is in a preset range value; and a determining unit, configured for determining a comparison result according to a judging result, and performing a voice broadcast on the comparison result.

In some embodiments, in response to detecting a first operation of a user, the apparatus is further configured for: determining whether a current voice broadcast is being carried out, and stopping the current voice broadcast if the current voice broadcast is being carried out; and determining whether the screen image is being presented currently, and continuing presenting the screen image if affirmed.

In a third aspect, the embodiment of the present application provides an electronic device, including: one or more processor; a voice receiving device, for receiving a voice message; a voice playing device, for playing the voice message; a display screen, for presenting image information; and a storage device, for storing one or more programs, wherein when the one or more programs are executed by the one or more processors, the one or more processors implement the method, for example, as described by any embodiment in the above first aspect.

In a fourth aspect, the embodiment of the present application provides a computer readable storage medium on which computer programs are stored. When the computer programs are executed by the processors, the method, as described by any embodiment in the above first aspect, is implemented.

According to the method and apparatus for processing information provided by the embodiment of the present application, by receiving a weather-related voice request sent by a user, the voice request may be identified, so that weather information corresponding to the voice request may be obtained. Then, based on the obtained weather information, key information may be extracted, and an appropriate background image may be selected from a prestored background image set, so that a screen image may be generated. Finally, voice broadcast may be performed on the weather information, and/or the screen image may be presented. This can help to diversify the weather information broadcasting ways and/or broadcasting contents, so that the method and the apparatus can be closer to needs of the user.

BRIEF DESCRIPTION OF THE DRAWINGS

Other features, objectives and advantages of the present application will become more apparent by reading a detailed description of the nonrestrictive embodiments made with reference to the following drawings:

FIG. 3A to FIG. 3G are schematic diagrams of application scenarios of the method for processing information according to the present application;

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
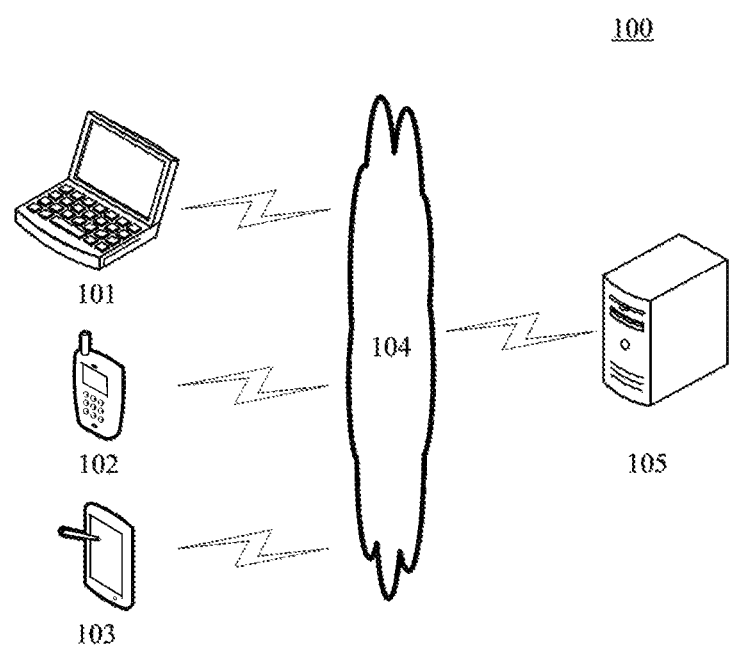
FIG. 1 is an illustrative system architecture diagram to which the present application can be applied.

FIG. 1 shows an exemplary architecture of a system 100 which may be used by a method for processing information or an apparatus for processing information according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as web browser applications, weather querying applications, voice recognition systems and video playing applications may be installed on the terminal devices 101, 102 and 103.

The terminal devices 101, 102 and 103 may be various electronic devices having a voice receiving device (for example microphone) and a voice play device, including but not limited to, smart phones, tablet computers, e-book readers, laptop computers and desktop computers. The terminal devices 101, 102 and 103 may analyze the weather-related voice request sent by a user and send the result (for example a weather data set) after processing to the user.

The server 105 may be server providing various services, for example, servers in the backend providing support for displaying webpages on the terminal devices 101, 102 or 103. The backend webpage server may perform a corresponding processing on data according to the received webpage request, and return weather information corresponding to the voice request received by the terminal devices 101, 102 or 103.

It should be noted that the method for processing information according to the embodiments of the present application is generally executed by the server 105, and accordingly, an apparatus for processing information is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
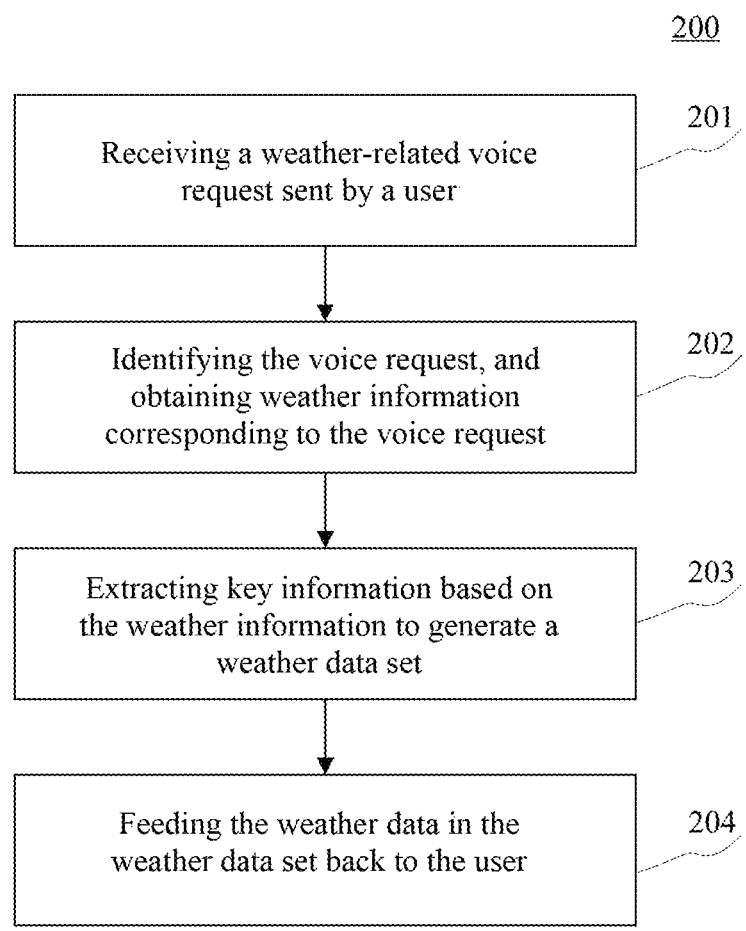
FIG. 2 is a flow diagram of an embodiment of the method for processing information according to the present application.

Further referring to FIG. 2, it shows a process 200 of an embodiment of the method for processing information according to the present application. The method for processing information may include the following steps.

In Step 201, a weather-related voice request sent by a user is received.

In the present embodiment, the electronic device (for example, the terminals 101, 102 and 103 shown in FIG. 1) on which the method for processing information runs can receive the weather-related voice request sent by a user through a variety of commonly used methods. For example, the weather-related voice request sent by the user is received through a voice input method installed on the electronic device. For another example, during a human-computer interaction dialogue with the electronic device, the weather-related voice request sent by the user is received through a voice receiving device (such as a microphone) mounted on the electronic device. Wherein, the voice request may include (but not limited to) character strings formed by characters including numbers, letters, Chinese characters etc.

In the present embodiment, the weather-related voice request may be a voice containing weather-related words and/or phrases. The correlation here may be direct correlation, such as "rain, wind, snow, fine day, cloudy day, hot, cold, air quality, haze weather" and other words or phrases appearing in the voice request; and the correlation may also be an indirect correlation, such as "umbrella, mask, hat, scarf or glove" and other words or phrases appearing in the voice request. In addition, the voice request may be used for generically querying a weather situation, for example, the content of the voice request is "What's the weather like today? Or what's the weather like in the next few days?"; and the voice request may also be used for accurately querying a weather situation, for example, the content of the voice request is "Will it rain this morning?". The content of the voice request may refer to what is shown in Table 1.

TABLE 1

| Weather information | Associate attributes | Examples |
| --- | --- | --- |
| Temperature | Overall query | What's the temperature in Beijing today? |
|  | Sub-property query | Will the temperature rise today/will the temperature drop tomorrow? |
|  | Sub-property query | The present temperature/today's maximum/minimum temperature |
| Cloudy | Overall query | Is Beijing going to be a cloudy day tomorrow? |
|  | Sub-property query | How long is the cloudy day going to last today? |
| Rainy | Overall query | Is Beijing going to rain tomorrow? |
|  | Sub-property query | How strong is the train in Beijing today?/How strong is the rain going to be today?/When will the rain stop?/What time is it going to rain? |
|  | Indirect query | Is it necessary to take an umbrella tomorrow?/Is it necessary to take an umbrella today? |
| Windy | Overall query | Is it going to be windy today? |
|  | Sub-property query | Will Beijing have a big wind tomorrow/today? |
| Foggy | Overall query | Is Shanghai going to be foggy tomorrow? |
|  | Sub-property query | How long will the fog last today/How big is the fog going to be today? |
| Snowy | Overall query | Is Harbin going to snow tomorrow? |
|  | Sub-property query | How heavy the snow will be tomorrow?/What time is the snow going to stop today? |
| Air quality | Overall query | What's the air quality today?/Is there going to be a haze? |
|  | Indirect query | Is it necessary to wear a mask today?/Do I need to wear a mask? |

In some optional implementations of the present embodiment, the content of the voice request may include a weather information need for a single day (e.g., a certain day) or a weather information need for at least two days (e.g., three days or seven days etc. in the further). The weather information need for a single day may further include at least one of the following requirements: a whole-day weather of a given day, a target-period (for example, in the morning, at noon, in the evening, 6:00-8:00 etc.) weather of the given day, a reference index of the given day and the air quality of the given day. Wherein, the reference index may include at least one of a dressing index, a car washing index, an exercise index, a traveling index, a cold index and an ultraviolet index. It should be noted that these reference indexes belong to frequently-used information in an existing weather forecast, and will not be repeated here.

It should be appreciated that in order to obtain more accurate weather information, the voice request may further contain a content related to a place and/or a time.

The correlation here also may be direct correlation or indirect correlation. For example, for a place, the voice request may contain latitude and longitude coordinates, a geographical name, a capital of ** province and so on. For example, for a time, the voice request may contain today, tomorrow, the day before yesterday, morning, afternoon and so on. A specific content of the voice request is not limited in the present application.

Optionally, the voice request may further contain information of at least two places, and/or time information, and/or weather-related information at the same time. In other words, when sending a voice request, a user may switch information of places, times, and/or weather etc., as shown in Table 2.

TABLE 2

| Switching types | Examples |
|---|---|
| Switching a place | What about the weather in Beijing today? And what about Nanjing? |
| Switching a time | Is there a rain in Beijing today? What about tomorrow? |
| Switching weather-related information | What's the weather in Beijing today? Is it going to rain? |
| Switching a place and a time | What about the weather in Guangzhou today? And what about Haikou tomorrow? |
| Switching a time and a weather | Is it fine for Beijing tomorrow? Is it cloudy the day after tomorrow? |

In Step 202, the voice request is identified and weather information corresponding to the voice request is obtained.

In the present embodiment, the electronic device may identify the voice request obtained in Step 201. Then, according to an identification result, the weather information corresponding to the voice request may be obtained from local or a server (for example, the server 105 shown in FIG. 1) in communication connection with the electronic device. Wherein, the weather information may be information for describing a weather situation, for example, the weather information released by a weather bureau.

In some optional implementations of the present embodiment, the electronic device may first judge whether the voice request contains a content related to a place and a time. If the judging result is yes, the electronic device may obtain the weather information that corresponds to the place and time. If the judging result is no, the electronic device may use a frequently-used positioning method, such as WiFi (wireless Fidelity) positioning, GPS (Global Positioning System) positioning, to obtain information of a current place. In addition, the electronic device may obtain a current date and a specific time based on a time recorded locally or by a server.

Optionally, if the judging result is no, the electronic device also may send a prompt message to the user to prompt the user to further determine the place and/or time. The prompt message here may be a text message or a voice message.

In Step 203, key information is extracted based on the weather information to generate a weather data set.

In the present embodiment, the electronic device may extract key information from the weather information obtained in Step 202 to further generate a weather data set. The key information here may be information mainly used for representing a weather situation, and the specific content is not limited. For example, the key information may include (but not limited to) at least one of date, week, real-time temperature, temperature range and wind power. When the voice request of a user contains a specific place content, the key information may further contain place information, for example,  (District) of  (City). The weather data in the weather data set may be data for describing a weather situation.

In some optional implementations of the present embodiment, the electronic device may extract the key information based on the obtained weather information. Meanwhile, a background image may be selected from a prestored background image set through analysis of the weather information. As an example, a background image matched with the weather information may be selected. If the weather is fine, a background image containing a blue sky or the sun may be selected from the background image set. As an example, the background image may also be selected based on the current daytime and night conditions. If the weather is fine, and is currently at night, a background image containing a starry sky may be selected from the background image set. Wherein, a storage position of the background image set is not limited in the present application. Moreover, the format of the background image is also not limited, as long as the electronic device supports the image display in this format.

Further, the electronic device also may generate a screen image based on the key information and the selected background image to generate the weather data set. Wherein, the screen image contains the key information and the background image. For example, the key information is superimposed at a preset position of the background image to generate the screen image.

As an example, firstly, the electronic device may determine a weather icon corresponding to the weather information based on the obtained weather information. Wherein, the weather icon may include at least one of a static picture, a dynamic image and a video. Then, the screen image may be generated based on the determined weather icon, an extracted key field and the selected background image. Wherein, the background image may include at least one of a static picture, a dynamic image and a video.

Optionally, if the content of the voice request includes the air quality of a day, after the electronic device generates the screen image according the key information and the selected background image, the electronic device may obtain parameter information (such as a name, a numerical value etc.) of a target contaminant (such as PM2.5, PM10, sulfur dioxide or ozone etc.) based on the information of the air quality of the day, and generate a contaminant screen image and a weather data set based on the parameter information and the selected background image. Here, the background image may be selected based on the severity of a haze.

In Step 204, the weather data in the weather data set is fed back to the user.

In the present embodiment, the electronic device may feed the weather data in the weather data set generated in Step 203 back to the user sending the voice request.

In some optional implementations of the present embodiment, the electronic device may process the weather data in the weather data set generated in Step 203 by using existing technologies, such as TTS (Text To Speech) etc., and feed the weather information back to the user in the form of voice broadcast. Here, the content of the voice broadcast may be a content related to the weather information. For example, main information of weather may be broadcast according to the content of the voice request of the user.

As an example, firstly, the electronic device may perform voice synthesis on the weather data in the weather data set to generate voice information containing background sounds. Wherein, the background sounds may include background music or sound effects related to the weather information. For example, when it is rainy, the background sounds may be a sound effect of the sound of rain, or music related to a rainy day. A specific setting mode of the background sounds is not limited herein. Then, the electronic device may broadcast the voice message according to a preset requirement. Wherein, the preset requirement may include a requirement on at least one of a language, a speech speed, a speech tone and a sound type. Here, the sound type may include a male voice, a female voice and a child's voice. In some application scenarios, a target voice (such as a voice of one's own and a voice of a certain star) may also be set to broadcast the voice message.

Optionally, if the weather data in the weather data set generated in Step 203 contain screen image data, and the electronic device is provided with a display screen at the same time, the electronic device also may present the screen image on its display screen.

As an example, if the content of the voice request includes the air quality of a day, the electronic device may present the screen image and the contaminant screen image in sequence according to a preset sequence after generating the weather data set. Wherein, the preset sequence may be set according to actual conditions. Here, the background image in the screen image may change according to the severity of a haze.

It should be appreciated that the electronic device may further obtain air quality information of at least three nearest days, such as the air quality information of tomorrow and the day after tomorrow relative to today. Meanwhile, an air quality screen image of a plurality of days is generated based on the selected background image. At this moment, the electronic device may present a screen image of the air quality of a single day, a contaminant screen image and a screen image of the air quality of a plurality of days, and a specific presenting sequence is not limited.

In some optional implementations of the present embodiment, if the electronic device currently detects weather early warning information, a background image matching a weather type indicated by the weather early warning information may be selected from the background image set; an early warning screen image is generated based on the weather early warning information and the selected matched background image; and voice broadcast is performed on the weather early warning information, and the early warning screen image is presented. Wherein, the weather early warning information may be early warning information for prompting a severe weather. The severe weather may include (but not limited to) a typhoon, a rainstorm, a sandstorm etc. Here, the weather early warning information mainly is information released by a weather bureau (of a central authority, a district etc.).

Further, the content of the voice request may further include weather comparison in different time periods in an identical place. Wherein, the weather comparison may include (but not limited to) temperature comparison. At this moment, the electronic device may compute a differential between maximum temperatures in different time periods, judge whether the differential is in a preset range value, determine a comparison result according to a judging result, and perform voice broadcast on the comparison result. For example, as shown in Table. 3.

TABLE 3

| Voice request | Maximum temperature comparison | Maximum temperature difference | Broadcast content |
|---|---|---|---|
| Is it hotter today than yesterday? | A > B | (0, 2] | Beijing is a little hotter today than it was yesterday, and the highest temperature is 30 degrees. |
| | A > B | (2, 5] | Beijing is hotter today than it was yesterday, and the highest temperature is 30 degrees. |
| | | (5, +∞) | Beijing is much hotter today than it was yesterday, and the highest temperature is 33 degrees. |
| | A = B | | Beijing is as hot today as it was yesterday, and the highest temperature is 30 degrees. |
| | A < B | (0, −2] | Beijing is a bit colder today than yesterday, and the highest temperature is 24 degrees. |
| | | (−2, −5] | Beijing is colder today than it was yesterday, and the highest temperature is 24 degrees. |
| | | (−5, −∞) | Beijing is much colder today than it was yesterday, and the highest temperature is 20 degrees. |

Optionally, the content of the voice request may further include weather comparison between different places in an identical time period. Wherein, the weather comparison also may include (but not limited to) temperature comparison. The specific process can be referred to the above related description, and will not be repeated here.

In addition, when detecting a first operation (such as touching a display screen or clicking a certain key) of the user, the electronic device may determine whether a current voice broadcast is being carried out, and stop the current voice broadcast if the current voice broadcast is being carried out; and the electronic device may further determine whether the screen image is currently being presented, and continue presenting the screen image if affirmed. In other words, if the screen image is presented during voice broadcast of a weather phenomenon, only the voice broadcast is stopped after the first operation is detected.

Further, when the user executes a second operation, such as sliding to the left or right on the display screen of the electronic device, the electronic device may further switch the presented screen image according to the second operation. When switching to the last screen image, even if the user continues to execute the identical second operation, the presented screen image is no longer changed.

It should be appreciated that based on the weather information, the electronic device may also generate information such as warm hints etc. and send the information to the user in a voice broadcast and/or screen image display mode. For example, if the air quality today is not good, the electronic device may generate information for prompting the user to wear a mask. If the electronic device cannot identify the voice request sent by the user, or cannot related conditions of the weather information etc. according to an identification result, the electronic device may also send a prompt message (i.e., a verbal trick for revealing all the details) to the user in a form of voice broadcast, thereby improving a human-computer interaction process and improving the user experience. The content of the prompt message may be set according to the voice request of the user, as shown in Table. 4.

TABLE 4

| Content of the request | Content of the prompt message |
| --- | --- |
| The weather three days ago/the weather in ten days | I don't know. May I ask the weather for me today or in the next five days? |
| Is there going to be a haze tomorrow? | I don't know. I can only help you inquire about the weather today. |
| What clothes to wear tomorrow?/Is the ultraviolet light going to be strong tomorrow? | I don't know. I can only help you inquire about it. |

It should be noted that if a voice playing device is mounted on the electronic device, the electronic device may feed the weather information back to the user in a voice broadcast mode. If a display screen is mounted on the electronic device, the electronic device may feed the weather information back to the user in a mode of presenting images with the display screen. If the voice playing device and the display screen are mounted on the electronic device at the same time, the electronic device may feed the weather information back to the user in the above two modes at the same time.

According to the method for processing information provided by the embodiment of the present application, by receiving a weather-related voice request sent by a user, the voice request may be identified, so that the weather information corresponding to the voice request may be obtained. Then, based on the obtained weather information, key information may be extracted, and an appropriate background image may be selected from a prestored background image set, so that a screen image may be generated. Finally, voice broadcast may be performed on the weather information, and/or the screen image may be presented. This can help to diversify the weather information broadcasting ways and/or broadcasting contents, so that the method and the apparatus can be closer to needs of the user.

Further referring to FIG. 3A to FIG. 3G, they are schematic diagrams of application scenarios of the method for processing information according to the present embodiment.

Figures 3A, 3B:

In FIG. 3A, if the terminal currently detects weather early warning information, an early warning screen image may be generated. Wherein, the screen image may contain key information that "Beijing issued a rainstorm blue alert on August 3rd, and it is suggested that you strengthen the precautionary measures and pay close attention to weather changes." While the early warning screen image is automatically presented, the key information may be broadcast in voice.

In FIG. 3B, the user may send a voice request of "the weather in this morning" to the terminal. After receiving the voice request, the terminal may obtain related weather information and generate a screen image in a target period (this morning) of a single day. Wherein, the screen image may contain "August 3rd (Date), Thursday (Week), Haidian district of Beijing (Location), a weather icon, fine (Weather Situation), a gentle breeze (Wind Power), 23°-36° (Temperature Range)" and other key information. While presenting the screen image, the terminal may broadcast "It's fine this morning, 23°-36°" to the user in voice. It should be noted that if the voice request of the user is "today's weather", the key information may also contain a real-time temperature (for example, 29°).

In FIG. 3C, the user may send "Is the haze serious today?" to the terminal in the form of a voice request. After receiving the voice request, the terminal may obtain related weather information and generate a screen image of the air quality of a single day. Wherein, the screen image may contain key information of "August 3rd (Date), Thursday (Week), Haidian District of Beijing (Location), 46 (Air index), excellent air quality (Level), and fit to go out and have a breath of fresh air (warm tips)". While presenting the screen image of the air quality of the single day, the terminal may broadcast "Beijing has excellent air quality today, and it is fit to go out and have a breath of fresh air" in voice.

In addition, the terminal may also further generate a contaminant screen image shown in FIG. 3D and a screen image of the air quality of a plurality of days shown in FIG. 3E. Wherein, the contaminant screen image may contain key information of "PM2.5 (Name), excellent (Level), 14 (Index), PM10, Excellent, 49, SO2, excellent, 2, NO2, excellent, 2, O3, excellent, 21, CO, excellent, 0.39, August 3rd, Thursday, and Haidian District of Beijing." The screen image of the air quality of a plurality of days may contain key information of "today, August 3rd, excellent, tomorrow, August 4th, excellent, the day after tomorrow, August 5th, good, and Haidian District of Beijing." At this time, the terminal may present the screen image of the air quality of a single day, the contaminant screen image, the screen image of the air quality of a plurality of days, and the screen image of the air quality of a single day in sequence, and may broadcast "Beijing has excellent air quality today, and it is fit to go out and have a breath of fresh air" in voice at the same time.

In FIG. 3F, the user may send a voice request of "What clothes are fit to wear today" to the terminal. After receiving the voice request, the terminal may obtain related weather information and generate a screen image of a single day index. Wherein, the screen image may contain key information of "Haidian District of Beijing, clothing: hot, ultraviolet light: strong, cold: less, exercise: relatively suitable, travel: suitable, car wash: relatively suitable, and corresponding icons." While presenting the screen image of the single day index, the terminal may broadcast "Today, it is recommended to wear clothes such as a thin coat and a sweater, and an old and infirm person should wear an overcoat, a woolen coat and a woolen sweater" in voice.

Figure 3G:
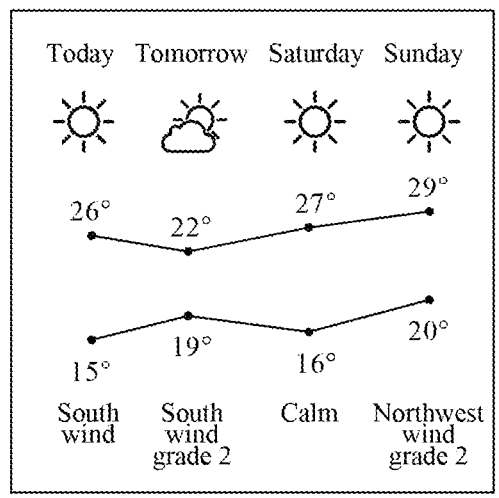

In FIG. 3G, the user may send a voice request of "What is the weather in the next few days" to the terminal. After receiving the voice request, the terminal may obtain related weather information and generate a screen image of the weather of a plurality of days. Wherein, the screen image may contain key information of "today, 26°, 15°, south wind, tomorrow, 22°, 19°, south wind grade 2, Saturday, 27°, 16°, calm, Sunday, 29°, 20°, northwest wind grade 2, and corresponding weather icon." While presenting the screen image of the weather of a plurality of days, the terminal may broadcast "Beijing is going to be fine mainly in the next three days and cloudy tomorrow" in voice.

It should be noted that FIG. 3A to FIG. 3G do not show the background image in the screen image. Moreover, the position of the above key information in the background image is only schematic. In addition, the terminal may animately play the above screen images in a certain sequence. In this way, while the broadcasting ways of the weather information and/or the diversification of broadcasting contents are enriched, it can be more appropriate to needs of the user, so that the user experience can be improved.

Figure 4:
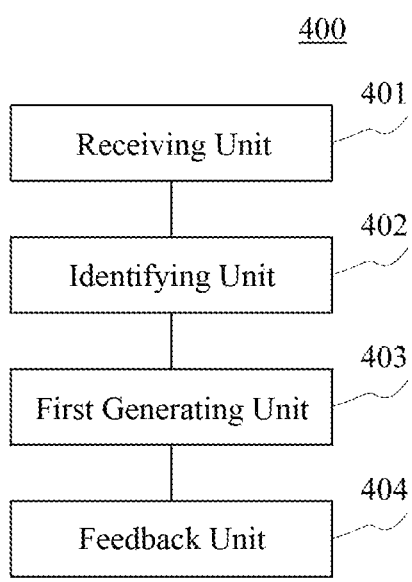
FIG. 4 is a structure diagram of an embodiment of the apparatus for processing information according to the present application.

Continue referring to FIG. 4, as an implementation of the method shown by each drawing, the present application provides an embodiment of the apparatus for processing information. The embodiment of the apparatus corresponds to the embodiment of the method shown in FIG. 2, and the apparatus can be specifically applied to various electronic devices.

As shown in FIG. 4, the apparatus 400 for processing information of the present embodiment may include: a receiving unit 401, configured for receiving a weather-related voice request sent by a user; an identifying unit 402, configured for identifying the voice request, and obtaining weather information corresponding to the voice request; a first generating unit 403, configured for extracting key information based on the weather information to generate a weather data set; and a feedback unit 404, configured for feeding weather data in the weather data set back to the user.

In the present embodiment, specific implementations and generated beneficial effects of the receiving unit 401, the identifying unit 402, the first generating unit 403 and the feedback unit 404 may be referred to related descriptions of Step 201, Step 202, Step 203 and step 204 in the embodiment shown in FIG. 2, and will not be repeated here.

In some optional implementations of the present embodiment, the feedback 404 may be further configured for performing a voice broadcast on the weather data in the weather data set.

Optionally, the first generating unit 403 may further include: a selecting subunit (not shown in the drawings), configured for extracting the key information based on the weather information, and selecting a background image from a prestored background image set; a generating subunit (not shown in the drawings), configured for generating a screen image based on the key information and the selected background image to generate a weather data set; and the feedback unit 404 may be further configured for presenting the screen image in the weather data set.

Further, the apparatus 400 may further include: a detecting unit (not shown in the drawings), configured for responding to currently-detected weather early warning information; a matching unit (not shown in the drawings), configured for selecting a background image matching a weather type indicated by the weather early warning information from the background image set; a second generating unit (not shown in the drawings), configured for generating an early warning screen image based on the weather early warning information and the selected matched background image; and a presenting unit (not shown in the drawings), configured for performing voice broadcast on the weather early warning information, and presenting the early warning screen image.

In some embodiments, the generating subunit (not shown in the drawings) may also be configured for: determining a weather icon corresponding to the weather information, wherein the weather icon includes at least one of a static picture, a dynamic image and a video; and generating the screen image based on the determined weather icon, the key information and the selected background image to generate the weather data set, wherein the background image includes at least one of a static picture, a dynamic image and a video.

Optionally, the feedback unit 400 may be further configured for: performing voice synthesis on the weather data in the weather data set to generate a voice message containing background sounds, wherein the background sounds include background music or sound effects related to the weather information; and broadcasting the voice message according to preset requirements, wherein the preset requirements include at least one of a language, a speech speed, a speech tone and a sound type.

As an example, the content of the voice request may include a weather information need for a single day or a weather information need for at least two days, and the weather information need for a single day may include at least one of the following requirements: a whole-day weather of a given day, a target-period weather of the given day, a reference index of the given day and air quality of the given day, wherein the reference index may include at least one of a dressing index, a car washing index, an exercise index, a traveling index, a cold index and an ultraviolet index.

In some application scenarios, when the content of the voice request includes the air quality of the same day, the apparatus 400 may further include: an obtaining unit (not shown in the drawings), configured for obtaining parameter information of a target contaminant based on information of the air quality of the given day; a third generating unit (not shown in the drawings), configured for generating a contaminant screen image based on the parameter information and the selected background image, and generating a weather data set; and the feedback unit 404 may be further configured for presenting the screen image and the contaminant screen image in sequence according to a preset sequence.

Optionally, the content of the voice request may further include weather comparison in different time periods in an identical place, wherein the weather comparison includes temperature comparison; and the apparatus 400 may further include: a computing unit (not shown in the drawings), configured for computing a differential between maximum temperatures in different time periods, and judging whether the differential is in a preset range value; and a determining unit (not shown in the drawings), configured for determining a comparison result according to a judging result, and performing voice broadcast on the comparison result.

Further, in response to detecting a first operation of a user, the apparatus 400 may be further configured for: determining whether a current voice broadcast is being carried out, and stopping the current voice broadcast if affirmed; and determining whether the screen image is currently being presented, and continuing presenting the screen image if affirmed.

Hereinafter, referring to FIG. 5, it shows a structure diagram of a computer system 500 of an electronic device suitable for implementing the embodiments of the present application. The electronic device shown in FIG. 5 is just an example, which does not impose any restrictions on the functionality and scope of application of the embodiments of the present application.

Figure 5:
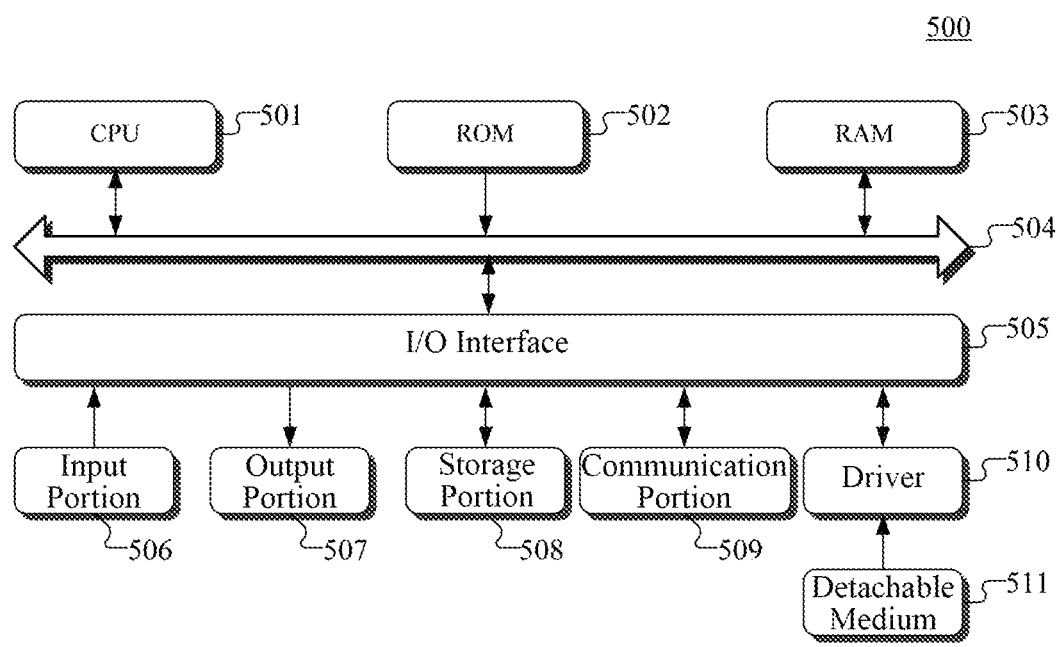
FIG. 5 is a structure diagram of a computer system suitable for implementing the electronic device in the embodiment of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present application. It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flowcharts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a receiving unit, an identifying unit, a first generating unit and a feedback unit, where the names of these units or modules are not considered as a limitation to the units or modules. For example, the receiving unit may also be described as "a unit for receiving a weather-related voice request sent by a user."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: receive a weather-related voice request sent by a user; identify the voice request and obtain weather information corresponding to the voice request; extract key information based on the weather information to generate a weather data set; and feed weather data in the weather data set back to the user.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for processing information, the method comprising:

receiving a weather-related voice request sent by a user, wherein content of the voice request comprises air quality of a day and a reference index for a single day, the reference index for the single day including at least a car washing index;

identifying the voice request, and obtaining weather information corresponding to the voice request, comprising: determining whether the voice request contains a content related to a place and a time, sending a prompt message to the user to prompt the user to further input the place and the time in response to determining that the voice request does not contain the content related to the place and the time, and acquiring the weather information corresponding to the place and the time inputted by the user;

extracting key information based on the weather information and selecting a background image from a previously stored background image set;

generating a screen image based on the key information and the selected background image to generate a weather data set, the screen image including an aggregate air quality index with a textual tip related to the air quality index;

obtaining parameter information of a target contaminant based on information of the air quality of a day, the target contaminant contributing to the aggregate air quality index;

generating a contaminant screen image based on the parameter information and the selected background image, the parameter information including a name of the target contaminant, an index of the target contaminant, and a level of the index of the target contaminant;

generating a single day screen image based on the reference index for the single day, the single day screen image including one or more icons for the reference index for the single day and a status for each of the one or more icons; and presenting the screen image, the contaminant screen image, and the single day screen image in sequence according to a preset sequence to the user automatically in response to the voice request, the preset sequence including presenting the screen image before presenting the contaminant screen image and the single day screen image.

2. The method for processing information according to claim 1, wherein the method further comprises:
performing a voice broadcast on weather data in the weather data set.

3. The method for processing information according to claim 1, the method further comprising:
selecting, in response to detecting current weather early warning information, a background image matching a weather type indicated by the weather early warning information from the background image set;
generating an early warning screen image according to the weather early warning information and the selected matched background image; and
performing a voice broadcast on the weather early warning information, and presenting the early warning screen image.

4. The method for processing information according to claim 1, wherein the generating a screen image based on the key information and the selected background image to generate the weather data set comprises:
determining a weather icon corresponding to the weather information, wherein the weather icon comprises one of a static picture, a dynamic image and a video; and
generating the screen image based on the determined weather icon, the key information and the selected background image to generate the weather data set, wherein the background image comprises one of a static picture, a dynamic image and a video.

5. The method for processing information according to claim 2, wherein the performing a voice broadcast on the weather data in the weather data set comprises:
performing a voice synthesis on the weather data in the weather data set to generate a voice message containing a background sound, wherein the background sound comprises one of a background music or a sound effect related to the weather information; and
broadcasting the voice message according to a preset requirement, wherein the preset requirement comprises one of a language, a speech speed, a speech tone and a sound type.

6. The method for processing information according to claim 1, wherein the content of the voice request further comprises a weather information request for a single day or a weather information request for at least two days; and
the weather information request for a single day comprises one of the following requirements: a whole-day weather of a given day, a target-period weather of the given day, or a reference index of the given day, wherein the reference index comprises one of a dressing index, a car washing index, an exercise index, a traveling index, a cold index and an ultraviolet index.

7. The method for processing information according to claim 1, wherein the content of the voice request further comprises a weather comparison request for different time periods in an identical place, wherein the weather comparison request comprises temperature comparison; and
the method further comprises:
computing a differential between maximum temperatures in different time periods, and judging whether the differential is in a preset range value; and
determining a comparison result based on a judging result, and performing a voice broadcast of the comparison result.

8. The method for processing information according to claim 1, in response to detecting a first operation of a user, the method further comprising:
determining whether a current voice broadcast is being carried out, and upon the determining that the current voice broadcast is being carried out, stopping the current voice broadcast; and
determining whether the screen image is currently being presented, and upon the determining that the screen image is currently being presented, continuing presenting the screen image.

9. An apparatus for processing information, the apparatus comprising:
at least one processor; and
a memory storing instructions, which when executed by the at least one processor, cause the at least one processor to perform operations, the operations comprising:
receiving a weather-related voice request sent by a user, wherein content of the voice request comprises air quality of a day and a reference index for a single day, the reference index for the single day including a car washing index;
identifying the voice request, and obtaining weather information corresponding to the voice request, comprising: determining whether the voice request contains a content related to a place and a time, sending a prompt message to the user to prompt the user to further input the place and the time in response to determining that the voice request does not contain the content related to the place and the time, and acquiring the weather information corresponding to the place and the time inputted by the user;

extracting key information based on the weather information and selecting a background image from a previously stored background image set;

generating a screen image based on the key information and the selected background image to generate a weather data set, the screen image including an aggregate air quality index with a textual tip related to the air quality index;

obtaining parameter information of a target contaminant based on information of the air quality of a day, the target contaminant contributing to the aggregate air quality index;

generating a contaminant screen image based on the parameter information and the selected background image, the parameter information including a name of the target contaminant, an index of the target contaminant, and a level of the index of the target contaminant;

generating a single day screen image based on the reference index for the single day, the single day screen image including one or more icons for the reference index for the single day and a status for each of the one or more icons; and presenting the screen image, the contaminant screen image, and the single day screen image in sequence according to a preset sequence to the user automatically in response to the voice request, the preset sequence including presenting the screen image before presenting the contaminant screen image and the single day screen image.

10. The apparatus for processing information according to claim 9, wherein the operations further comprise performing a voice broadcast on weather data in the weather data set.

11. A non-transitory computer storage medium, on which computer programs are stored, wherein when the computer programs are executed by processors, cause the processors to perform operations, the operations comprising:

receiving a weather-related voice request sent by a user, wherein content of the voice request comprises air quality of a day and a reference index for a single day, the reference index for the single day including at least a car washing index;

identifying the voice request, and obtaining weather information corresponding to the voice request, comprising: determining whether the voice request contains a content related to a place and a time, sending a prompt message to the user to prompt the user to further input the place and the time in response to determining that the voice request does not contain the content related to the place and the time, and acquiring the weather information corresponding to the place and the time inputted by the user;

extracting key information based on the weather information and selecting a background image from a previously stored background image set;

generating a screen image based on the key information and the selected background image to generate a weather data set, the screen image including an aggregate air quality index with a textual tip related to the air quality index;

obtaining parameter information of a target contaminant based on information of the air quality of a day, the target contaminant contributing to the aggregate air quality index;

generating a contaminant screen image based on the parameter information and the selected background image, the parameter information including a name of the target contaminant, an index of the target contaminant, and a level of the index of the target contaminant;

generating a single day screen image based on the reference index for the single day, the single day screen image including one or more icons for the reference index for the single day and a status for each of the one or more icons; and presenting the screen image, the contaminant screen image, and the single day screen image in sequence according to a preset sequence to the user automatically in response to the voice request, the preset sequence including presenting the screen image before presenting the contaminant screen image and the single day screen image.

* * * * *